US007299451B2

(12) United States Patent
Dygon et al.

(10) Patent No.: US 7,299,451 B2
(45) Date of Patent: Nov. 20, 2007

(54) REMOTELY DRIVEN SYSTEM FOR MULTI-PRODUCT AND MULTI-PLATFORM TESTING

(75) Inventors: John G. Dygon, Morrisville, NC (US); Hongcheng Mi, Raleigh, NC (US); Jeremie Wood, Hamilton (CA); Gary M. Wrayno, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1025 days.

(21) Appl. No.: 10/056,508

(22) Filed: Jan. 24, 2002

(65) Prior Publication Data

US 2003/0140138 A1    Jul. 24, 2003

(51) Int. Cl.
*G06F 9/44* (2006.01)

(52) U.S. Cl. ....................... 717/124; 717/127

(58) Field of Classification Search ................ 717/124, 717/125, 127, 138, 126; 702/1, 108; 700/90, 700/108, 109; 379/10.01, 10, 1; 707/10, 707/104.1; 703/2, 22, 23, 104.1
See application file for complete search history.

(56) References Cited

U.S. PATENT DOCUMENTS

| | | | |
|---|---|---|---|
| 3,986,106 A | 10/1976 | Shuck et al. ................ 324/54 |
| 4,034,195 A | 7/1977 | Bates ......................... 714/46 |
| 4,456,994 A | 6/1984 | Segarra ....................... 714/33 |
| 4,694,242 A | 9/1987 | Peterson et al. .......... 324/73.1 |
| 4,696,003 A * | 9/1987 | Kerr et al. .................... 714/38 |
| 4,718,112 A | 1/1988 | Shinoda ................... 455/151.4 |
| 5,021,997 A * | 6/1991 | Archie et al. ................ 714/31 |
| 5,220,658 A * | 6/1993 | Kerr et al. ..................... 703/22 |
| 5,254,942 A | 10/1993 | D'Souza et al. ............ 714/727 |
| 5,353,240 A | 10/1994 | Mallory et al. ............ 702/186 |
| 5,394,347 A * | 2/1995 | Kita et al. ..................... 703/2 |
| 5,396,170 A | 3/1995 | D'Souza et al. ......... 324/158.1 |
| 5,669,000 A * | 9/1997 | Jessen et al. .............. 717/127 |
| 5,671,351 A * | 9/1997 | Wild et al. ................... 714/38 |
| 5,708,774 A * | 1/1998 | Boden ......................... 714/38 |
| 5,751,941 A * | 5/1998 | Hinds et al. ................. 714/38 |
| 5,754,760 A * | 5/1998 | Warfield ...................... 714/38 |
| 5,758,061 A * | 5/1998 | Plum ........................... 714/35 |
| 5,778,169 A * | 7/1998 | Reinhardt .................... 714/38 |
| 5,805,795 A * | 9/1998 | Whitten ....................... 714/38 |
| 5,822,615 A | 10/1998 | Yamashita et al. ........... 710/10 |
| 5,911,041 A | 6/1999 | Schaffer ...................... 714/38 |

(Continued)

FOREIGN PATENT DOCUMENTS

WO    WO 96/00419    1/1996

OTHER PUBLICATIONS

"TOBAC: a test case browser for testing object-oriented software", Ernst Siepmann et al, 1994, pp. 154-168.*

(Continued)

*Primary Examiner*—Todd Ingberg
(74) *Attorney, Agent, or Firm*—Synnestvedt & Lechner LLP

(57) ABSTRACT

A system and method for automated testing of software products for use in a multi-platform and multi-product environment. The system comprises a series of databases in combination with a kernel of executable code for automatically running the testing process and displaying the test results. The system can be accessed via a web browser user interface.

10 Claims, 3 Drawing Sheets

U.S. PATENT DOCUMENTS

| | | | |
|---|---|---|---|
| 5,913,023 A * | 6/1999 | Szermer | 714/38 |
| 5,918,037 A * | 6/1999 | Tremblay et al. | 716/2 |
| 5,946,372 A * | 8/1999 | Jones et al. | 379/10.01 |
| 5,966,541 A * | 10/1999 | Agarwal | 717/132 |
| 5,974,256 A * | 10/1999 | Matthews et al. | 717/141 |
| 5,991,537 A * | 11/1999 | McKeon et al. | 717/115 |
| 6,031,990 A * | 2/2000 | Sivakumar et al. | 717/124 |
| 6,067,639 A | 5/2000 | Rodrigues et al. | 714/38 |
| 6,107,815 A | 8/2000 | Nikutta et al. | 324/765 |
| 6,161,219 A * | 12/2000 | Ramkumar et al. | 717/130 |
| 6,212,672 B1 * | 4/2001 | Keller et al. | 717/104 |
| 6,219,829 B1 * | 4/2001 | Sivakumar et al. | 717/131 |
| 6,223,337 B1 * | 4/2001 | Blume | 717/126 |
| 6,226,784 B1 * | 5/2001 | Holmes et al. | 717/100 |
| 6,236,952 B1 | 5/2001 | Jun et al. | 702/119 |
| 6,237,138 B1 | 5/2001 | Hameluck et al. | 717/128 |
| 6,275,976 B1 * | 8/2001 | Scandura | 717/120 |
| 6,279,124 B1 * | 8/2001 | Brouwer et al. | 714/38 |
| 6,286,033 B1 * | 9/2001 | Kishinsky et al. | 709/203 |
| 6,305,010 B2 * | 10/2001 | Agarwal | 717/126 |
| 6,332,211 B1 * | 12/2001 | Pavela | 717/130 |
| 6,405,364 B1 * | 6/2002 | Bowman-Amuah | 717/101 |
| 6,473,772 B1 * | 10/2002 | Barrett et al. | 707/104.1 |
| 6,473,794 B1 * | 10/2002 | Guheen et al. | 709/223 |
| 6,502,102 B1 * | 12/2002 | Haswell et al. | 707/102 |
| 6,505,342 B1 * | 1/2003 | Hartmann et al. | 717/104 |
| 6,526,526 B1 * | 2/2003 | Dong et al. | 714/46 |
| 6,601,018 B1 * | 7/2003 | Logan | 702/186 |
| 6,633,861 B2 * | 10/2003 | Hart et al. | 706/47 |
| 6,662,236 B1 * | 12/2003 | Apte et al. | 719/320 |
| 6,662,312 B1 * | 12/2003 | Keller et al. | 714/38 |
| 6,678,355 B2 * | 1/2004 | Eringis et al. | 379/22 |
| 6,701,514 B1 * | 3/2004 | Haswell et al. | 717/115 |
| 6,711,134 B1 * | 3/2004 | Wichelman et al. | 370/241 |
| 6,748,585 B2 * | 6/2004 | Proebsting et al. | 717/136 |
| 6,766,481 B2 * | 7/2004 | Estep et al. | 717/124 |
| 6,772,821 B1 * | 8/2004 | Fulton et al. | 164/150.1 |
| 6,775,824 B1 * | 8/2004 | Osborne et al. | 717/125 |
| 6,782,355 B1 * | 8/2004 | Cook et al. | 703/23 |
| 6,792,595 B1 * | 9/2004 | Storistenau et al. | 717/110 |
| 6,802,059 B1 * | 10/2004 | Lyapustina et al. | 717/143 |
| 6,804,634 B1 * | 10/2004 | Holzmann et al. | 703/2 |
| 6,810,364 B2 * | 10/2004 | Conan et al. | 702/188 |
| 6,817,009 B2 * | 11/2004 | Flanagan et al. | 717/126 |
| 6,823,445 B2 * | 11/2004 | May et al. | 712/226 |
| 6,826,752 B1 * | 11/2004 | Thornley et al. | 718/100 |
| 6,847,916 B1 * | 1/2005 | Ying | 702/183 |
| 6,904,634 B2 * | 6/2005 | Smith | 7/128 |
| 6,907,546 B1 * | 6/2005 | Haswell et al. | 714/38 |
| 6,934,934 B1 * | 8/2005 | Osborne et al. | 717/126 |
| 7,000,224 B1 * | 2/2006 | Osborne et al. | 717/125 |
| 7,003,414 B1 * | 2/2006 | Wichelman et al. | 702/76 |
| 7,051,340 B2 * | 5/2006 | Fisher et al. | 719/328 |
| 7,073,166 B2 * | 7/2006 | Bera | 717/130 |

OTHER PUBLICATIONS

"Generating User Inferface Code in a Model Based User Interface Deveoplment Environment", Paulo Pinheiro da Silva et al, ACM, 2000, pp. 155-160.*

"Improving the Maintaainability of Automated Test Suites", Cern Kaner, 1997, pp. 1-17.*

"Generating Test Cases from UML Specifications", Aymur Abdurazik et al, May 199, pp. 1-103.*

Test Environment Toolkit, TETware User Guide, Revision 1.2 TET3-UG-1.2, The Open Group, Sep. 18, 1998, pp. 1-116.*

Test Environment Toolkit, TETware Programmers Guide, Revision 1.2 TET3-PG-1.2, The Open Group, Sep. 18, 1998, pp. 1-258.*

Using Netscape 2, Mark R. Brown, 1995, pp. 7-9.*

Improving the Maintainability of Automated Test Suites, Cern Kaner, 1997, 17 pages.*

Derwent Patent Abstract of JP08331203A, publication of Dec. 13, 1996, 2 pages.*

"Using Rational Robot", Rational Software Corporation, 1998, Whole Manual.*

Method of Remote Debugging for OS2/2/2 Type of Software, IBM Technical Disclosure Bulletin, vol. 37, No. 06B, Jun. 1994, p. 65-68.

* cited by examiner

REMOTELY DRIVEN SYSTEM FOR MULTI-PRODUCT AND MULTI-PLATFORM TESTING

FIELD OF THE INVENTION

The present invention relates to testing of computer products, and more specifically relates to a novel remotely driven automated testing system which can be implemented with several different products and several different platforms.

BACKGROUND OF THE INVENTION

Software application developers generally conduct extensive testing of their products to ensure that they work as desired. The products often need to be tested using various operating systems and various hardware components, often located at various physical or geographical sites.

As the computer field continues to grow at a rapid pace, the need to test application performance also continues to grow. Applications are continually being developed, and the ability to test these new applications greatly facilitates the process of application development. Thus, the application testing field has grown and continues to grow to keep up with the rapid expansion of the software field.

Typically, the software product development process (performed by a "programmer") is a separate process from the software product testing process (performed by a "tester"). A programmer will often have a good understanding of how a software product will behave under everyday processing conditions; however, the programmer may not have completely considered how the software product will behave under rare or unexpected conditions. Often this can be the cause of errors within the software product. Additionally, most software products are developed by keyboarding characters into a computer; thus, the possibility of typographical errors always exists, and such errors may be randomly distributed throughout the software product. As a result, an error may be located in an obscure logical path, and thus be difficult to find.

As a result of the potential for errors during the development of a software product, in-depth testing is necessary to identify all such errors. The testing process usually consists of having a tester design a test to supply predetermined variable inputs to the program and collect the resulting output. This output is then analyzed by comparing it to the desired or expected output for a particular set of input variables.

A tester designing a test for a particular application typically first ascertains the specifications of the software product being tested. These specifications are a basic "blueprint" used by the programmer when designing the product, and by providing them to the tester, the tester can better understand how the product is intended to function. From the product specifications, the tester creates a number of "assertions." An assertion is a determination of how the product will behave when it is performing properly in a given situation or in response to a given set of input values.

For each assertion, the tester then develops a set of software "test cases." Test cases are scenarios which provide various situations to the product, as described in more detail below. The goal of the test cases is to verify the assertions. Test cases can be short operations which verify one particular function, or they can be longer operations which verify entire processes. For example, an assertion could be made regarding how the program will respond when the installation function is executed within a given operating system or platform. Thus, an entire installation procedure might comprise a single test case. Various test cases are created by the tester in an effort to fully test all aspects of the product.

If every assertion for a given product operating in a particular operating system is verified by using a test case, the product is deemed to be fully tested. Typically, a large number of test cases are required to be developed to test the product in conjunction with various combinations of software and hardware platforms.

Often the tester is provided with little information regarding the structure and design of the code comprising the software product. The product is tested by applying test cases, observing the output of the software product, and comparing the output to the expected result. This type of testing is referred to as "black box" testing. These tests are often conducted manually, and require the tester to carefully record the sequence of test case inputs and the output results from the product.

Separate test cases are typically developed for every product and every platform in which the product could be used. Many scenarios for which test cases are developed are appropriate tests for all products and all platforms. For example, a test case simulating the software installation process is a test case which is desired for virtually every product. In addition, a separate test case to test the installation process for each platform in which the product operates (e.g., windows, MS-DOS, UNIX, etc.) is also appropriate.

In an effort to automate the testing process, scripting and macro languages are often used to conduct the testing process. A script tool or macro tool allows some degree of automation in the test sequence, and aids in reproducing test cases. Examples of such tools are ".BAT" files in the MS-DOS environment and "shell scripts" in the UNIX environment. However, while these tools have aided in the automation of the testing input, collection and analysis of the test results remains largely a manual process.

An additional problem with using scripting/macro tools in testing is that the tool itself and the test cases being processed using the tool must be configured to each computing environment in which the software product is to be tested. For example, a particular operation in a Microsoft Windows® environment may be tested by simulating an "OPEN" menu operation, while a similar function may require an "OK" menu operation in an Apple Macintosh® environment. The test scripts must be changed to test the same function of an application operating in two different platforms.

The goal of "black box" testing is to exercise all logical possibilities for a given product and assure that the product works as desired in every case, and often for several different platforms. However, in general, it is difficult to exhaustively test a computer program. The number of possibilities that need to be tested can be extensive, and complete exhaustive testing can take more time than is practicable.

The need for the development of a large number of specific test cases has made the testing of software products very time consuming and costly. As a result, a need exists for an automated test system that has the ability to apply test cases to a large number of products operating in a variety of platforms. Furthermore, it is desired to have a test system that can automatically collect, store and analyze the results and provide the test engineer with appropriate, meaningful feedback on the performance of the product.

SUMMARY OF THE INVENTION

The present invention is a method, apparatus, and computer program product to facilitate automated testing of multiple software products operating on multiple platforms. The present invention allows for the testing process to be conducted remotely, which enables the software products to exist on a variety of computers located at various locations.

According to the present invention, a series of databases is provided. These databases contain information vital to the testing process. Information concerning the attributes of the various products that are subject to test is stored in a database, herein referred to as the Product Description Database. Information concerning the various execution platforms is stored in a database, herein referred to as the Platform Preference Database. Information about the various test cases are stored in a database, herein referred to as the Test Definition Database. Finally, the test result information is stored in a database, herein referred to as the Test Result Database.

To allow a user to interface with the present invention, a user interface is provided. This allows the user to launch desired testing processes, and monitor test results. Because the present invention is designed for remote testing, the user can interface the system via an internet browser.

The present invention retrieves a test case that has been selected by the user from the Test Definition Database, places it in a queue (herein referred to as the Test Execution Queue), and then executes each test case by remotely running each test case through the product that is the desired object of the particular test case. When the results of each test are returned, they are processed to compare them with the expected or desired output. The final processed results are then stored in the Test Results Database as well as being returned to the user.

DETAILED DESCRIPTION OF THE INVENTION

The system described herein is a preferred embodiment for the remote testing of software applications in a multi-product and multi-platform environment. The present invention allows a user to interface with the system via an internet browser and remotely conduct various tests on a variety of products, each operating in a variety of computer platforms.

Figure 1:
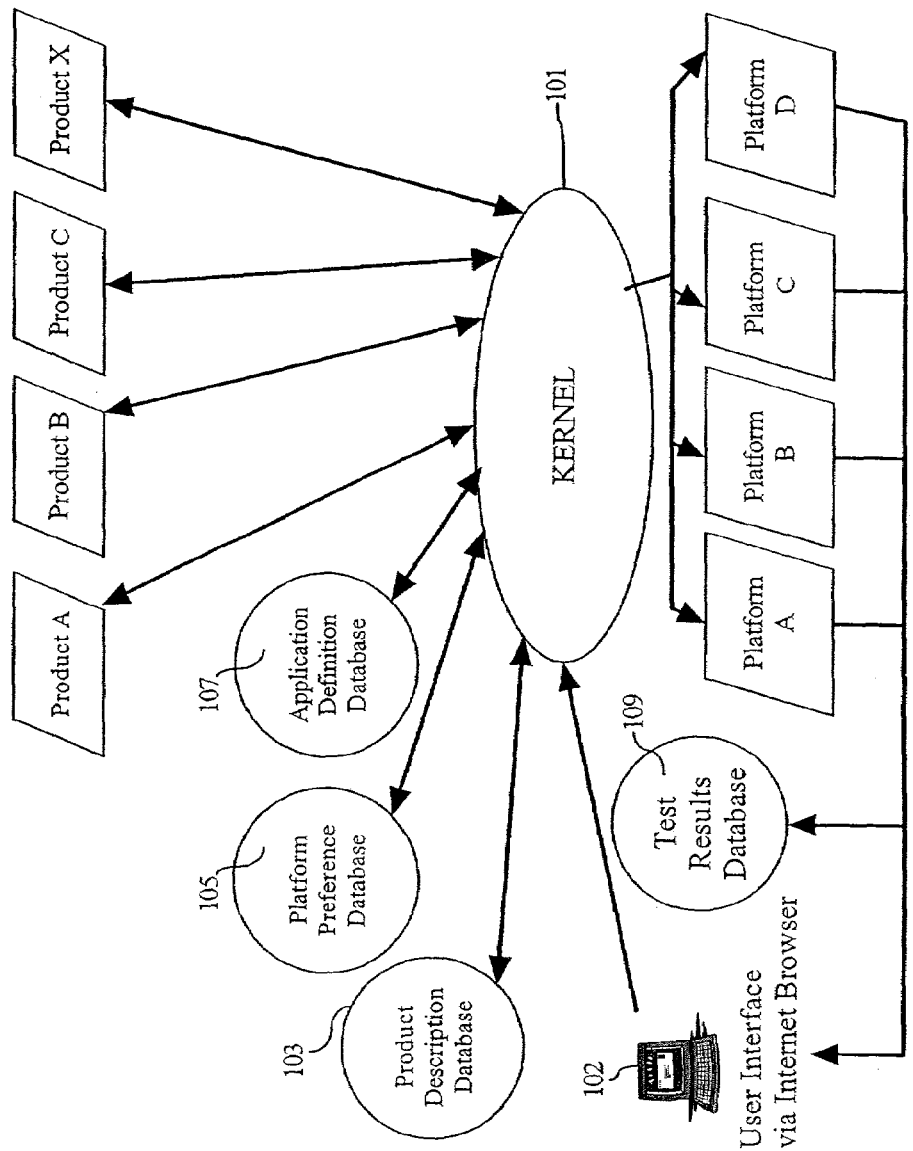
FIG. 1 is a graphical depiction of the interrelation of elements which comprise the present invention and the environment in which the present invention operates.

FIG. 1 is a graphical depiction of the elements which comprise the present invention and the environment in which the present invention operates. As shown in FIG. 1, the preferred embodiment of the present invention includes a kernel 101. A kernel is the center or nucleus of a system that controls the other parts of the system. The kernel of the preferred embodiment contains executable code that functions in conjunction with a series of databases 103-109. This series of databases is created to allow the present invention to be expandable and scalable. Information that varies as the product or platform varies is not coded into the kernel 101; instead, such product or platform specific information is stored in one of the databases. This allows the user to easily add an additional product or platform, or a new test case, by simply adding the required information to the appropriate database. No changes to the program code located within the kernel are needed.

The Product Description Database 103 contains information (e.g., location, names of associated batch files) about the various products that will be subject to testing. Within this database, each product is defined by storing the attributes that are necessary to apply test cases to that particular product, such as the physical location of a particular product (i.e., the addresses where the product resides) and any other necessary product specific parameters.

A Platform Preference Database 105 is also created. The Platform Preference Database 105 is similar to the Product Description Database; however, the Platform Preference Database 105 is used to store information and attributes of the various execution platforms. For example, programming code written in multi-platform languages (such as PERL, C++, or Java) is compiled into bytecodes capable of being run on a specific platform using the parameters of the platform for which the code is being compiled. These platform specific parameters are stored in the Platform Preference Database 105.

An Test Definition Database 107 is created to store the names and addresses of the various test cases. The code that comprises the test cases themselves can be located at any location on the network. The information in the Test Definition Database 107 defines the location of the test cases. Additionally, some test cases require co-requisite test cases to be run. A co-requisite test case is a test case that must be run along with another test case to allow it to function properly. For example, in order to test the ability of a product to install and run a particular function, an install test case might need to be executed along with a test case for the running of the particular function. These would be co-requisite test cases for a test designed to install and run the function. Information regarding any co-requisite tests that need to be run for a particular test case is stored in the Test Definition Database 107.

By creating these databases to store information about the products, platforms, and test cases, the preferred embodiment of the present invention is easily expandable and scalable. As will be discussed in greater detail herein, the addition of a new item (product, platform, test case) is easily achieved by modifying the appropriate database, and does not require extensive modifications to the testing system of the present invention.

In addition to the above specified databases, a database (referred to herein as the Test Results Database) is created to store the results of each test case. The Test Results Database 109 stores the information regarding the results of the performed tests (e.g., whether the product has passed the test, failed the test, or fallen somewhere in between). The results stored in the Test Results Database 109 have already been processed (as discussed below) and, in the preferred embodiment, are displayed to the user accessing a web page via an internet browser user interface 102.

As shown in FIG. 1, the system can automatically and remotely test several products using several different platforms. The present invention operates remotely from the various products and platforms. The present invention can reside on one of the machines where a product is hosted, or it can be on a separate server. The preferred embodiment operates similar to that of a virtual machine, which can be located anywhere in the network. The user has the ability to access the system remotely via the internet using the user interface 102.

Figure 2:
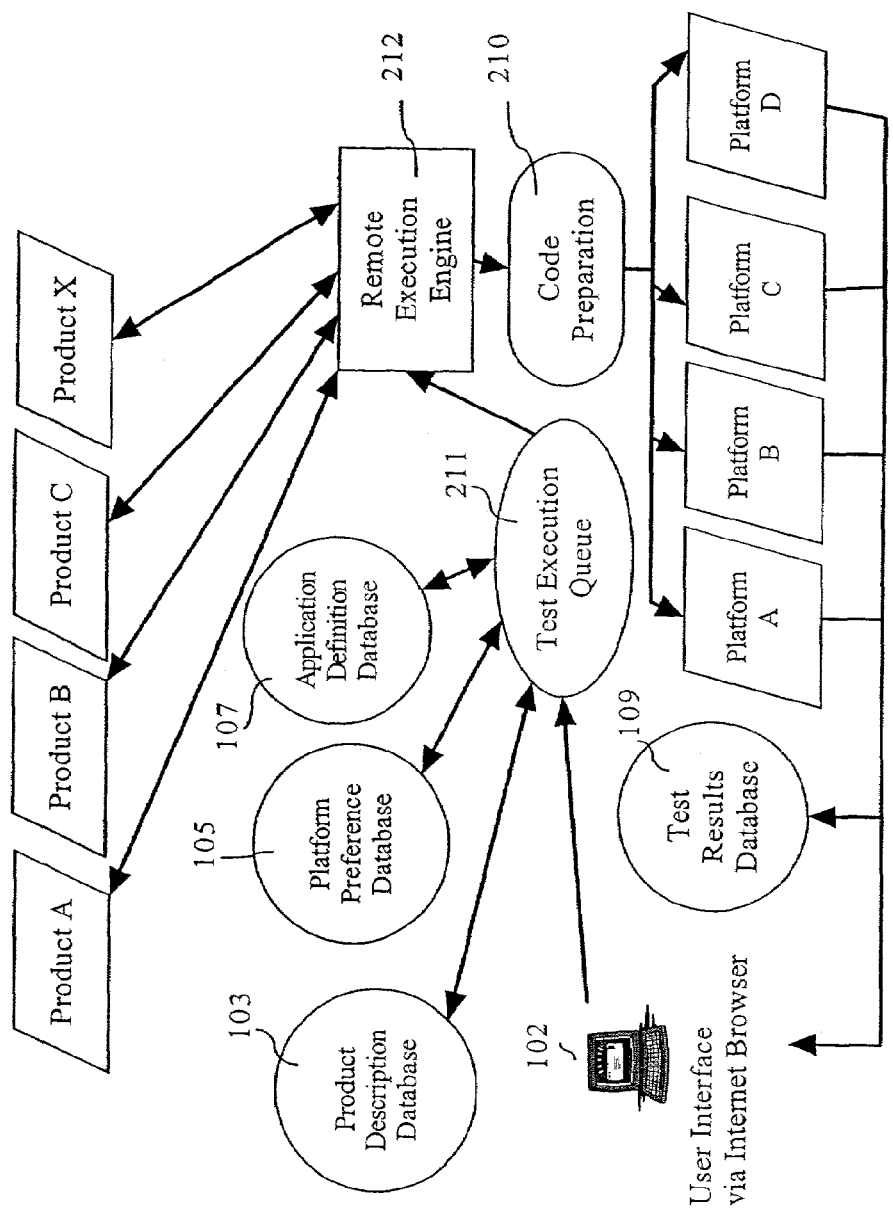
FIG. 2 is an illustration of components of the present invention, including portions which comprise the kernel, and the interrelation between each of them.

FIG. 2 is an illustration of the preferred embodiment of the present invention showing the elements that are contained within the kernel portion.

The test cases are executed by a segment of logic referred to herein as the Remote Execution Engine 212. In the preferred embodiment, the executable code comprising the Remote Execution Engine 212 is located in the kernel portion (101 of FIG. 1). The kernel 101 is the "brain" of the present invention, and can be located on the same server which hosts one or more of the products, or it can be located on a different server elsewhere in the network. The Remote Execution Engine 212 receives information regarding which test cases are to be executed, locates the test case or cases (using the name and address information contained in the Test Definition Database 107), prepares the test case to run in the appropriate product using the appropriate platform (using the information contained in the Product Definition Database 103 and the Platform Preference Database 105), and executes the test case. The Remote Execution Engine 212 executes the test by selecting the proper batch file contained within it for the selected product. The batch files contain the varied execution commands for each product along with the parameters required to execute the test case.

The Remote Execution Engine 212 receives instructions regarding which test cases to execute from the Test Execution Queue 211. The Test Execution Queue 211 stores the test cases that are to be run, the sequence in which they are to be run, and the time for execution. This information is placed in the Test Execution Queue 211 by the user interacting through the web browser user interface. By using Test Execution Queue 211 to store the information about the tests, the user can schedule testing at optimum times. For example, a test case that could take several hours to complete could be placed in the Test Execution Queue 211 and scheduled to execute after business hours so that the results are available when the user arrives for work the following morning.

The output from the product subject to test is returned to the Remote Testing Engine 212. The user can view the output if desired, or the output can be further processed to provide the user with meaningful end results as described in more detail below. This is done using the Code Preparation Module 210.

The Code Preparation Module 210 processes the results that were obtained by the Remote Execution Engine 212. In order to do this, the results are compiled into bytecode that can be executed on the selected platform. This process links together the output that was compiled. The linked output is then selectable for execution on the desired platform. This process is completed using well known compile and link techniques. This step makes the results "self-checking." This means that it is no longer necessary for the test engineer to manually compare the returned results with the expected results. The Code Preparation Module 210 performs the checking procedure by comparing the results received by the Remote Execution Engine 212 with the expected or desired results, and from this process creates a report that is sent to the user interface relaying the pertinent information such as if the particular product passed or failed, the time required to execute the test, etc.

The results are also stored in the Test Results Database 109, where they can be retrieved and reviewed by the tester at a later time. This gives the tester the ability to run subsequent tests and compare the results to previously executed tests. In the preferred embodiment, the results are viewable graphically on a web page so that a tester can quickly review them. For example, an indicator such as a color scheme can be used to display tests that completed successfully in green and those that failed in red. The web page displays the content which is stored in the Test Results Database.

The present invention provides a system that is easily expandable and scalable. A user may desire to add additional test cases for the existing products, or the user may desire to add additional products to be tested by the existing test case, or the user may desire to have the existing products tested on a different platform, or the user may desire any combination of these changes.

To add an additional test case, the only change that needs to be made is to update the Test Definition Database with the name and location of the new test case. The actual code comprising the new test case can be located anywhere on the network. No changes need to be made to any of the executable code in the kernel.

In order to add a new platform, the Platform Preference Database is updated with the necessary information about the new platform. Again, no changes need to be made to any of the executable code in the kernel.

If it is desired to add an additional product, the user need only update the Product Description Database with the necessary information about the new product. This requires slight modification to the executable code within the kernel. The batch commands to execute the new product need to be inserted into the Remote Execution Engine so that the Remote Execution Engine has the ability to run the new product. These changes can easily be made via the user interface 102.

The preferred embodiment of the invention uses Practical Extraction and Reporting Language (PERL) for the executable codes contained within the kernel of the system. PERL is a desired language for the present invention because it is a script programming language which can be compiled before execution into cross-platform bytecode. This makes it conducive to the present application as it can be run on any of the platforms upon which a product may reside. However, it should be understood that the present invention also could be written in other languages capable of providing similar features (e.g., C++, Java).

Figure 3:
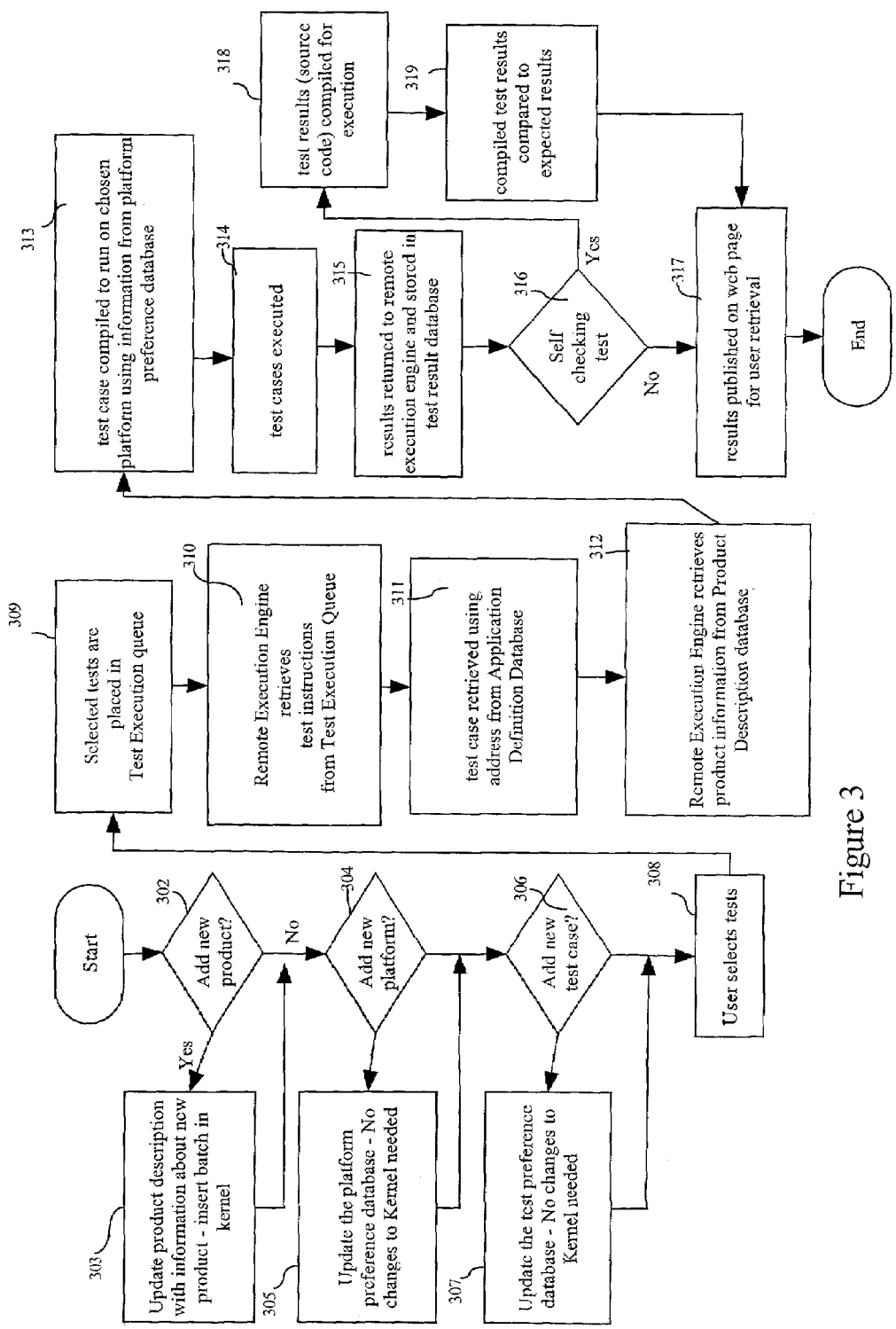
FIG. 3 is a flow chart illustrating the testing process in accordance with the present invention.

FIG. 3 illustrates the testing process in accordance with the present invention. Before beginning the testing process, the user determines whether the product to be tested, the test case, or the desired platform is presently in the testing system (steps 302, 304, 306). If a new product, test case, or platform is needed, they can easily be added (steps 303, 305, 307).

Next, the user selects, via the user interface, the test cases which he or she wishes to run at step 308. These selections are placed in the Test Execution Queue at step 309. The Remote Execution Engine receives the test instructions from the Test Execution Queue at step 310. The address of the test case is obtained by the Remote Execution Engine from the Test Definition Database at step 311. The necessary parameters (addresses, etc.) to run the test case on a particular product and a particular platform are obtained from the Product Description Database and the Platform Preference Database at steps 312 and 313.

The Remote Execution Engine executes the test cases at step 314. The output of the products in response to the test case input is returned to the Remote Execution Engine (step 315). The present invention is designed to offer full automation by making the test cases self-checking; however, it is not limited to self-checking test cases. If the test case is not self checking (i.e., the results are not to be processed in any manner such as comparing them to expected data), the results are placed in the Test Results Database and displayed on a web page (step 317). If the test case is self-checking, the results returned by the product in source code form is compiled and processed by the Code Preparation Module to compare the received results with the expected or desired results to determine how the product performed (step 319). The processed results are then placed in the Test Results Database and displayed on a web page (step 317).

The present invention provides a better system to test computer software products. It allows for easier and more thorough testing of the products. By implementing an automated system, it enables the test engineer to reproduce the chosen tests as often as desired. Furthermore, the present invention is self-checking, which relieves the test engineer from the time consuming task of comparing the test results with the expected performance of the product. The present invention allows for testing of multiple products, and is easily expandable when the test engineer desires to add an additional product. It allows for the testing of the products on multiple platforms without having to alter the test cases, and it allows for an additional platform to easily be added. By providing a better means for testing the products, the ability to develop new software applications is greatly enhanced.

It should be understood that the foregoing is illustrative and not limiting and that obvious modifications may be made by those skilled in the art without departing from the spirit of the invention. Accordingly, the specification is intended to cover such alternatives, modifications, and equivalence as may be included within the spirit and scope of the invention as defined in the following claims.

We claim:

1. A method stored on a computer readable medium and executed on a computer for automated testing of software products in a multi-platform and multi-product environment comprising the steps of:
    selecting a list of at least one test case by a user via a user interface, wherein said step of selecting a list further comprises the steps of:
        selecting a software product to be tested by said test case from said multi-product environment; and
        selecting a platform for said software product to operate from said multi-platform environment;
    storing said list in a queue;
    executing said test cases contained on said list automatically at specified times; and
    storing output information generated by said software products.

2. The method as set forth in claim 1, wherein the step of executing said test cases contained on said list automatically at a specified time further comprises the steps of:
    retrieving location and attribute information about said test case from a database;
    using said location and attribute information to extract said test case;
    applying input information associated with said test case to said software product.

3. A method as set forth in claim 1, further comprising the step of:
    evaluating said output information generated by said software product to determine whether said product is operating as properly.

4. A method as set forth in claim 1, further comprising the step of:
    displaying said output information on a web page accessible through an internet user interface.

5. The method as set forth in claim 1, wherein the step of applying input information associated with said test case to said software product further comprises the steps of:
    retrieving a batch file containing execution commands;
    running said execution commands;
    providing said input information as specified in said execution commands to said application; and
    receiving source code output from said product.

6. A computer program product for automated remote testing of a software product in a multi-product and multi-platform environment, comprising computer executable instructions for:
    storing identifying information for a list of user selected test cases in a queue;
    extracting said test case from a specified location using said information;
    executing said test case at a specified time wherein said test case is configured to test a software product selected from said multi-product environment, said software product operating on a platform selected from said multi-platform environment;
    storing the output generated from the execution of said test case.

7. A computer program product as set forth in claim 6, wherein the computer executable instructions for executing said test case further comprise instructions for:
    using identifying information in said queue to retrieve a batch file containing execution commands;
    running said execution commands;
    providing said input information as specified in said execution commands to the said software product; and
    accepting source code output from said software product.

8. A computer program product as set forth in claim 6, wherein the computer executable instructions for storing the output generated from the execution of said test case further comprises instructions for:
    compiling said source code output for processing; and
    processing said compiled source code.

9. A computer program product as set forth in claim 8, further comprising instructions for displaying said results on a web page.

10. A computer program product as set forth in claim 6, wherein the computer executable instructions for processing said compiled source code further comprises instructions for:
    comparing said output with pre-established expected output;
    determining results based upon whether said software product passed, partially passed or failed the testing process; and
    providing said results to the user.

* * * * *